United States Patent Office 3,166,535
Patented Jan. 19, 1965

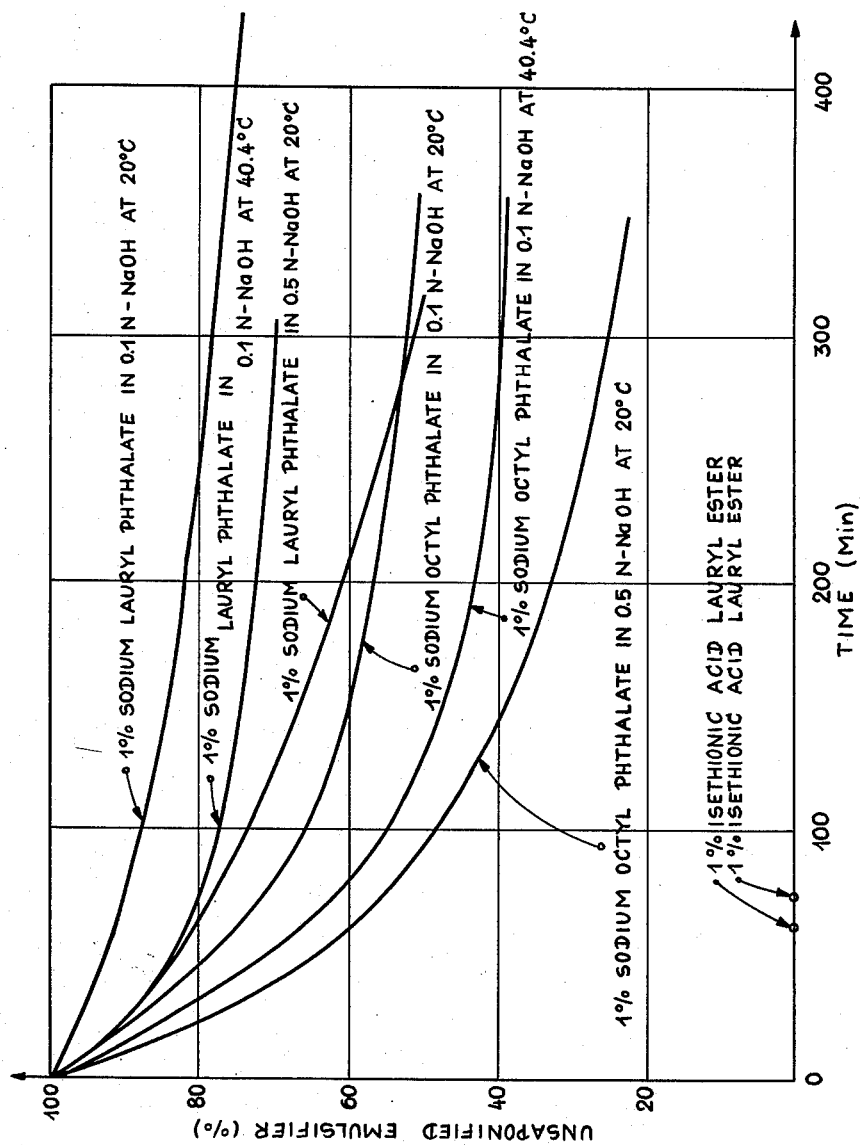

3,166,535
PROCESS FOR THE POLYMERIZATION OF ETHYL-
ENICALLY UNSATURATED MONOMERS
Günter Messwarb, Kelkheim, Taunus, and Peter Seibel,
Frankfurt am Main, Germany, assignors to Farbwerke
Hoechst Aktiengesellschaft vormals Meister Lucius &
Brüning, Frankfurt am Main, Germany, a corporation
of Germany
Filed Jan. 26, 1962, Ser. No. 168,976
Claims priority, application Germany, May 7, 1956,
F 20,232
9 Claims. (Cl. 260—87.1)

The present invention relates to an improved process for the polymerization of ethylenically unsaturated monomers. More especially the invention relates to an improved process for the polymerization of vinyl- and/or vinylidene monomers in an aqueous emulsion.

This application is a continuation-in-part application of co-pending application Serial No. 656,180 filed May 1, 1957 (now abandoned) by Günter Messwarb et al. for "Process for preparing chlorine-containing emulsion or suspension polymers."

It is known to prepare emulsion or suspension polymers from polymerizable unsaturated compounds by emulsifying a monomer or a mixture of monomers in water or emulsifying a solution of a monomer in a solvent immiscible with water, such as a hydrocarbon, and then polymerizing the emulsions thus obtained in known manner in the presence of a catalyst.

Many of the emulsion polymerization processes hitherto known have the disadvantage that the surface active compounds (emulsifiers or dispersing agents) used for emulsifying the monomer and, if desired, also the resulting polymer, in an aqueous medium can be removed only incompletely from the polymer even by very thorough washing. The residues of emulsifiers adhering to the polymer, however, often impair its quality considerably.

It is already known to use phthalic acid diesters as emulsifiers in polymerization. These diesters can be hydrolyzed after the polymerization whereby their emulsifying action ceases. However, the known phthalic acid diesters can adequately be hydrolyzed for industrial purposes only by a prolonged treatment at a temperature above 60° C. as will become obvious of the tests described below.

To ensure a mild treatment of the polymers which is essential to preserve the quality of the product, it is the purpose of the present invention to provide an emulsifier that can be hydrolyzed at a temperature below 60° C. and preferably at room temperature.

It is another purpose of the invention to provide a method for emulsion polymerization that is suitable to realize all advantageous properties of said emulsifier.

It has been found that ethylenically unsaturated monomers can be polymerized in an aqueous emulsion by emulsifying said monomers with the use of an emulsifier comprising an ester of an aliphatic monocarboxylic acid having 6 to 25, preferably 8 to 14, carbon atoms and an aliphatic alcohol having 1 to 2 carbon atoms and bearing as a substituent a hydrophilic group, carrying out the polymerization in known manner in a weakly alkaline to acid aqueous emulsion, e.g. within a pH range between 2 and 8, and subsequently hydrolyzing the emulsifier present in the reaction mixture to form non-surface active constituents by shifting the pH value of the reaction mixture into the strongly alkaline region. As emulsifiers or dispersing agents there have to be used such as are sensitive to strongly alkaline pH values but sufficiently stable in the weakly alkaline to acid pH range for carrying out the emulsion polymerization. Such types of emulsifiers will be designated in the following lines as "hydrolyzable emulsifiers" because they are susceptible to hydrolysis by chemical reaction resulting in the breakage of an ester linkage that is present in the emulsifier molecule. The "hydrolyzable emulsifiers" accordingly possess as a common feature an ester linkage connecting a hydrophilic alcohol portion to an acid portion having an aliphatic hydrocarbon chain. These compounds can be defined by the formula

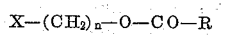

X—(CH$_2$)$_n$—O—CO—R wherein X is a hydrophilic group such as a sulfonic acid group, a phosphonic acid group or a tertiary alkyl-ammonium halide group, R is an aliphatic hydrocarbon chain of 5 to 24, preferably 7 to 13, carbon atoms, and $n$ is an integer in the range from 1 to 2.

The sulfonic acid group mentioned above is defined by the formula

in which Z is hydrogen. It is, however, within the scope of the invention that water-soluble salts of the corresponding sulfonic acids are used. Accordingly, Z can mean instead of hydrogen an alkali metal radical, particularly a sodium or potassium radical. The same holds true when X is a phosphonic acid group

wherein each Z may either mean hydrogen or one of the aforementioned metal radicals.

The tertiary alkyl ammonium halide group can be defined by the formula

wherein R′, R″, and R‴ are each a saturated aliphatic or cycloaliphatic hydrocarbon radical having up to 6 carbon atoms, preferably not more than 2 carbon atoms, e.g. a methyl, ethyl, n- or isopropyl, n-, iso- or tert.-butyl, amyl, hexyl, cyclopentyl or cyclohexyl radical, and Hal means a halogen atom, preferably bromine or more preferably chlorine.

The radical R is, as pointed out above, an aliphatic hydrocarbon radical having 5 to 24, preferably 7 to 13, carbon atoms, saturated straight chain radicals being preferred. Accordingly, R may be an n-pentyl, n-hexyl, n-heptyl, n-octyl, n-nonyl, n-decyl, n-undecyl, or n-dodecyl (i.e. lauryl) radical as well as a higher aliphatic hydrocarbon radical such as a stearyl, oleyl, or palmityl radical.

Suitable emulsifiers that can be applied according to the invention are, for instance, the esters formed by an aliphatic carboxylic acid as defined above and, as the alcohol portion, a halide of a trialkyl ammonium-substituted primary aliphatic alcohol having 1 to 2 carbon atoms in addition to those of the alkyl group of the trialkyl ammonium substituent. Such alcohols are, for instance, choline hydrochloride having the formula

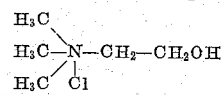

the corresponding hydrobromide, the corresponding triethyl compounds, and the trialkyl monohydroxymethyl ammonium halides. Further compounds that can be used as emulsifiers according to the invention are the esters of an aliphatic monocarboxylic acid having 6 to 25 carbon atoms and a primary aliphatic alcohol substituted by a phosphonic acid group or by a sulfonic acid group. Examples for such alcohol components are hydroxyethyl phosphonic acid of the formula $$H_2O_3P—CH_2—CH_2OH$$

hydroxyethyl sulfonic acid (isethionic acid) of the formula $$HO_3S—CH_2—CH_2OH$$

and hydroxymethyl phosphonic and sulfonic acids as well as the salts of those acids wherein the hydrogen atoms of the sulfo- and phospho- groups respectively are replaced by alkali metal atoms.

The accompanying drawing shows diagrammatically some test results showing the speed of hydrolysis of a compound used as emulsifier according to the invention.

The tests, the results of which are shown in the drawing, were carried out in order to estimate the hydrolyzability of some ester type emulsifiers under mild conditions. 0.1% solutions of various emulsifiers in 0.1 N and 0.5 N sodium hydroxide solutions were prepared and were kept at 20° C. and 40° C. respectively. Samples of the solutions were titrated in intervals of several hours using phenol phthalein as indicator to determine the progress of hydrolysis with the time.

The course of the hydrolysis during the first 400 minutes is illustrated in the drawing. The curves show that after 300 minutes under the conditions specified above the known emulsifier sodium lauryl phthalate has been hydrolyzed in the optimum case to an extent of 50%, the likewise known sodium octyl phthalate to an extent of about 75%. Contrary thereto an emulsifier of the invention, viz. the sodium salt of isethionic acid lauryl ester of the formula $$NaSO_3—CH_2—CH_2—O—CO—C_{11}H_{23}$$

had been hydrolyzed to 100% already after 60 to 70 minutes. In order substantially to hydrolyze the last mentioned phthalic acid ester emulsifiers considerably stronger reaction conditions must be employed. Such conditions cannot, however, be observed without the polymer being impaired in the presence of alkali sensitive and heat sensitive polymers such as polyvinyl chloride or polyvinylidene chloride, acrylonitrile or vinyl esters.

Further tests were carried out in order to estimate the surface tension of 1% solutions of sodium lauryl phthalate, sodium octyl phthalate (both being known in the art) and the sodium salt of isethionic acid lauryl ester as an emulsifier according to the invention at various pH values using a tensiometer of the Du Nouy type (see C. E. G. Sumner, "The Theory of Emulsions," 5th edition, London, 1954, pages 624/625). The pH value of the solutions was adjusted in each case with very small amounts of hydrochloric acid solution or sodium hydroxide solution in order to use only a very small amount of electrolyte and thus to avoid any salt effect on the surface tension.

These tests showed that a 1% solution of sodium lauryl phthalate has substantially the same surface tension as water (about 75 dyn./cm.) as far as pH values of 4 and less are concerned. Also a 1% solution of sodium octyl phthalate possesses in this pH range a strongly reduced surface active effect. The two solutions exhibit a surface tension of less than 35 dyn./cm. only in a very narrow range between pH 5 and pH 7. Contray thereto a 1% solution of the sodium salt of the isethionic acid lauryl ester has essentially an independent surface tension of about 38 to 40 dyn./cm. in the range between pH 1 and pH 8. The test results establish that sodium octyl phthalate and sodium lauryl phthalate as emulsifier can be used industrially only in a relatively narrow pH range. More especially they can only be used at a pH above 5. Small amounts of acid as they always appear owing to hydrogen chloride being split off in the polymerization of vinyl chloride or vinylidene chloride make this type of emulsifier inactive. In contrast therewith the emulsifying activity of the sodium salt of the isethionic acid lauryl ester is not substantially impaired even at a pH value below 5.

The emulsion polymerization processes in which the emulsifiers mentioned are useful are well known in the art and are described, e.g. in "Polyvinylchlorid und Vinylchlorid-Mischpolymere" by F. Kainer, Springer-Verlag, Berlin—Göttingen—Heidelberg, (1951), pages 42 to 51; "Polymerisationskinetik" by L. Küchler, Springer-Verlag, Berlin—Göttingen—Heidelberg, (1951), pages 151 to 160; and "Polymer Processes" by C. B. Schildknecht, Interscience Publishers Inc., New York (1956), pages 111 to 174. In emulsion polymerization processes the liquid monomer is emulsified in an aqueous phase, the extremely fine distribution of the monomer droplets being achieved by the addition of an emulsifying agent. The polymerization of the monomer occurs at the interface between these droplets and the aqueous phase under the action of a radical-forming polymerization catalyst. The most preferred products that can be manufactured by emulsion polymerization processes are the homo- and copolymers of vinyl chloride, vinylidene chloride, styrene, acrylic acid esters of alcohols having up to 18 carbon atoms, such as acrylic acid methyl-, ethyl-, propyl-, butyl- or octyl-esters, methacrylic esters of the same alcohols, acrylonitrile, vinyl esters of carboxylic acids having up to 18 carbon atoms, such as vinyl acetate, -formate, -propionate, or -butyrate, or butadiene. These monomers are more particularly defined as vinyl monomers and vinylidene monomers respectively because they contain as a common feature either the vinyl group $CH_2=CH—$ or the vinylidene group $CH_2=C=$. The present invention, however, is not limited to the polymerization of a certain class of monomers.

The emulsifiers used in the process of this invention can be hydrolyzed after the polymerization at temperatures within the range of 5° C. to 60° C. and preferably between room temperature (about 20 to 25° C.) and about 50° C., which temperature ranges are especially advantageous from a technical point of view.

The emulsifiers of the invention are used in concentrations as are usual in the emulsion polymerization art. Concentrations from 0.1 to 5%, calculated on the weight of the monomer, are recommended.

The polymerization may be initiated in the usual manner with any initiator known in the art. Especially suitable are water-soluble radical forming polymerization initiators of the peroxide type, such as hydrogen peroxide, peroxy acetic acid, alkali and alkaline earth metal salts of peroxy sulfonic acid. If desired, the peroxide polymerization initiators may be activated by the addition of a heavy metal salt in an amount of 1 to 100 ppm. calculated on the monomer, such as water-soluble salts of iron or manganese. Other suitable initiator systems which have the advantage of providing radicals at a comparably low temperature are the so-called redox systems such as about equimolar amounts of potassium persulphate and formaldehyde sodium sulfoxylate (known as rongalite), hydrogen peroxide and rongalite, hydrogen peroxide and rongalite and ferrous sulfate, sodium persulfate and sodium bisulfite, hydrogen peroxide and ferrous sulfate. The invention is, however, not limited to the use of a specific initiator system.

To carry out the process of the invention by modification of a conventional emulsion polymerization process, 1000 parts by weight of water, 100 to 1200 parts by weight of one or more of the monomers defined above, 1 to 60 parts by weight of a hydrolyzable emulsifier as defined herein, 0.1 to 30 parts by weight of a polymerization initiator, 1 to 120 parts by weight of an optional buffering agent such as mono- or disodium phosphate, if desired, and, if necessary, a sufficient amount of an acid to provide a pH value between 2 and 8 are admixed as a batch in a polymerization vessel and, if desired, are heated, preferably under pressure and while stirring, to an elevated temperature sufficiently high to cause polymerization. In case a redox system is used as the initiator heating may often be omitted. In this case at most one of the components of said redox system is originally present in the batch and the other components are introduced during the course of the polymerization, e.g. during 1 to 10 hours, by increments or continuously. Of course, also the monomer can be introduced partially or completely in the course of the process. The temperature is maintained at a suitable value, e.g. in the range between room temperature and 80° C., that value depending on the character of the monomer and the initiator system used. The temperature is maintained during an appropriate period of time, e.g. 1 to 10 hours, while stirring is continued. If elevated pressures are used, a drop in pressure in the polymerization vessel is indicative of the completion of polymerization. Subsequently, the remaining pressure is released, the batch is allowed to cool, e.g. to ambient temperature, and a strong alkaline reagent is added in order to hydrolyze the emulsifier. A strong alkaline reagent suitable for imparting an alkaline pH value is, e.g. an alkali or alkaline earth metal hydroxide, such as sodium hydroxide, potassium hydroxide, lithium hydroxide, calcium hydroxide (e.g. in the form of milk of lime), strontium hydroxide, or barium hydroxide. An alkyl ammonium hydroxide is also suitable. Likewise suitable are alkali metal and alkaline earth metal salts of weak acids, e.g. the alkali metal carbonates or acetates. Preferably said strong alkaline reagent is added in the form of an aqueous solution. A "strong alkaline reagent" that is used for alkalizing the aqueous medium according to the invention is defined herein as an alkaline material imparting to this medium a pH value of at least 10. It is obvious that such an effect can be achieved using each of the alkalies mentioned hereinbefore whereas it is impossible to achieve a pH value in the desired range by the addition of a so-called "weak alkali" such as ammonia.

After the addition of a strong alkaline reagent to the aqueous polymer emulsion, the pH value of the aqueous phase should generally be at least 10. In some cases, it is advantageous to heat the thus alkalinized aqueous medium to a moderate temperature, e.g. in the range between 30 and 55° C., in order to accelerate the hydrolysis of the emulsifier. By this alkaline treatment the ester linkage of the hydrolyzable emulsifier is hydrolyzed irreversibly whereby the emulsifier is deprived of its emulsifying activity because the fractions obtained by hydrolysis have no surface active properties. These fractions obtained are either soluble in water or compatible with the polymer so that the polymer cannot exhibit effects such as produced by non-hydrolyzable emulsifiers.

Subsequent to this treatment which should last in general about 2 to 300 minutes and which in general is accompanied by a coagulation of the polymer emulsion, the polymer included in the alkalinized aqueous medium is processed further in the usual manner. It is advisable first to neutralize the aqueous medium by the addition of a strong acid such as hydrochloric acid, sulfuric acid, phosphoric acid, nitric acid, or an organic acid, e.g. a carboxylic acid such as formic acid, or an organic sulphonic acid such as benzene sulfonic acid or toluene sulfonic acid. The solid particles are then separated from the aqueous phase containing the fractions of the hydrolyzed emulsifier, e.g. by filtration or centrifuging, are washed in the usual manner and dried, if desired. In some cases it may be advantageous before separating the polymer from the aqueous phase to heat the aqueous phase comprising the polymer to a temperature below the softening point of the polymer in order to facilitate agglomeration.

A particularly advantageous method of operating the present invention consists in carrying out the hydrolysis of the emulsifier by means of an alkali metal hydroxide and subsequently, preferably after completion of the hydrolysis of the emulsifier, adding an alkaline earth metal hydroxide, e.g. one of the hydroxides of the alkaline earth metals mentioned above, preferably calcium hydroxide, of which the fatty acid salts are sparingly soluble in water. It is known that alkaline earth metal salts of fatty acids are valuable stabilizers for polymer materials, preferably polymers containing halogen atoms and more preferably vinyl chloride. Thus the emulsifier, as soon as it is no longer needed in order to emulsify the polymer in the aqueous phase, is changed to a stabilizer useful in the further processing of the polymer. If desired, the aqueous alkaline medium containing the hydrolized emulsifier, may be acidified before adding the alkaline earth metal hydroxide.

Alternatively, the emulsifier may first be hydrolized by means of a metal hydroxide the fatty acid salts of which are more or less soluble in water, the reaction mixture is then acidified, and the fatty acid is converted into a water-insoluble metal soap by the addition of a hydroxide of a suitable metal, for example, of an alkaline earth metal.

Another important advantage of the process of the invention is that the alkaline earth metal salts of the hydroxy-alkyl-sulfonic acids, for example, isethionic acid, which are set free during the splitting are easily soluble in water, so that the polymer can easily be freed from hydrophilic impurities, for example, in the presence of barium ions.

Of course, the process of the invention can be carried out by any other method useful for conducting an emulsion polymerization and is by no means limited to the particular method described in the foregoing paragraphs.

The process of this invention differs from the known emulsion polymerization processes in that after the polymerization the pH value of the aqueous medium of the polymer emulsion or dispersion is changed, e.g. to a pH value above 8, preferably at least 10, which treatment involves decomposition of the hydrolyzable emulsifier used by hydrolysis to form cleavage products that can easily be removed by washing respectively and do not impair the quality of the resulting polymer.

The following examples serve to illustrate the invention, but they are not intended to limit it thereto; the percentages and parts mentioned throughout the examples being by weight unless otherwise stated.

*Example 1*

A 40 liter autoclave was charged with 5 liters nitrogen-scavenged, distilled water, 50 grams of the sodium salt of isethionic acid lauryl ester and 2 grams rongalite and the autoclave was carefully freed from atmospheric oxygen. The following three components were then continuously and uniformly metered in:

(1) Monomer:
  10 kilograms=11 liters vinyl chloride at a rate of 500 cc. per 10 minutes.
(2) Redox component A:
  5 liters distilled water
  16 grams rongalite at a rate of 200 cc. per 10 minutes.
(3) Redox component B:
  5 liters distilled water
  50 grams of the sodium salt of isethionic acid lauryl ester
  18 cc. $H_2O_2$ (of 35% strength).

The reaction temperature was maintained at 50° C. The stirrer had a speed of 75 revolutions per minute.

After a reaction time of about 3.5 hours the pressure had dropped by 1.5 atmospheres. The conversion amount to 80–85% by weight, calculated on the monomer. A polymer latex was obtained which was diluted with water to double the volume and then adjusted to pH 12 with sodium hydroxide solution. After a reaction time of one hour 45 grams $Ba(OH)_2 \cdot 8\ H_2O$ were slowly added while stirring and the whole was allowed to stand over night. The free alkali present in the reaction mixture was then neutralized to a final pH 9 by adding hydrochloric acid, the polymer was separated from the mother liquor and carefully washed. After drying a very pure, pre-stabilized polyvinyl chloride having a K value of 70 was obtained.

Example 2

In the autoclave described in Example 1, 10 kilograms vinyl chloride were polymerized in an aqueous emulsion as described in the preceding example. As emulsifier the lauric acid ester of cholin hydrochloride was used (150 grams=1.5% by weight, calculated on the vinyl chloride). To the polymer latex formed a solution of 57 g. $CdCl_2 \cdot 2\frac{1}{2}H_2O$ in 450 cc. of water was added and subsequently sodium hydroxide solution was added in an amount such that the reaction mixture had a pH value of 12. After having reacted for 2 hours at room temperature, the polymer was processed as described in Example 1. A very pure polyvinyl chloride was obtained having a K value of 66.

Example 3

In a 50 liter autoclave there was polymerized under a nitrogen atmosphere at a temperature of 50° C. and with a stirring speed of 75 revolutions per minute the following reaction mixture 10 kilograms vinyl chloride.
16 liters nitrogen-scavenged, distilled water.
110 grams of the sodium salt of isethionic acid lauryl ester.
15 grams sodium persulfate.

After a pressure drop of about 1.5 atmospheres, which corresponded to a conversion of the monomer in an amount of 80–85% by weight, the reaction was terminated by withdrawing the residual vinyl chloride. The polymer latex formed was adjusted at 40° C. to pH 12 by adding dilute sodium hydroxide solution. After a time of stay of 90 minutes an aqueous solution of 70 grams $CaCl_2 \cdot 6H_2O$ was added to the reaction mixture. The pH of the reaction mixture was adjusted to 9 by adding dilute HCl and the mixture was processed as usual. A pure-pre-stabilized polyvinyl chloride was obtained having a K value of 71.

Similar results are obtained when instead of vinyl chloride a mixture of 90% vinyl chloride and 10% vinyl acetate is polymerized according to this example.

We claim:

1. In an aqueous emulsion polymerization process comprising agitating a mixture of at least one ethylenically unsaturated monomer, water, an emulsifier and a radical forming polymerization initiator, said mixture having a pH value in the range between 2 and 8, and subsequently separating the polymer product formed from the aqueous phase, the improvement comprising the steps of (A) using as the emulsifier from 0.1 to 5 percent, by weight of said monomer, of a compound of the formula $$X-(CH_2)_n-O-CO-R$$

wherein X is a member selected from the group consisting of the sulphonic acid group, the phosphonic acid group, an alkali metal salt of any of said groups, and a trialkyl ammonium halide radical the alkyl groups of which having up to 6 carbon atoms each, R is an aliphatic hydrocarbon radical of 5 to 24 carbon atoms, and n is an integer from 1 to 2; and (B) decomposing the emulsifier at a temperature of from 5° to 60° C. by hydrolysis by raising the pH value of the aqueous emulsion to at least 10 prior to separating the polymer product formed from the aqueous phase.

2. The process of claim 1 wherein vinyl chloride is homopolymerized.

3. The process of claim 1 wherein vinyl chloride and vinyl acetate are copolymerized.

4. The process of claim 1 wherein the emulsifier is an ester of a choline hydrohalide and an aliphatic monocarboxylic acid having 6 to 25 carbon atoms.

5. The process of claim 1 wherein the emulsifier is an alkalimetal salt of an ester of a hydroxyalkyl phosphonic acid and an aliphatic monocarboxylic acid having 6 to 25 carbon atoms.

6. The process of claim 1 wherein the emulsifier is an alkali metal salt of an ester of a hydroxyalkylsulfonic acid and an aliphatic monocarboxylic acid having 6 to 25 carbon atoms.

7. The process of claim 1 wherein said aliphatic hydrocarbon radical R has 7 to 13 carbon atoms.

8. The process of claim 1 wherein the alcoholic component of the decomposed emulsifier is washed from said polymer product with water, and the fatty acid component of the decomposed emulsifier is converted to a water insoluble alkaline earth metal salt stabilizer for said polymer product by adding an alkaline earth metal hydroxide thereto.

9. A process as in claim 1 wherein the said ethylenically unsaturated monomer is selected from the group consisting of vinyl chloride, vinylidene chloride, styrene, acrylic and methacrylic acid esters of alcohols having up to 18 carbon atoms, and vinyl esters of carboxylic acids having up to 18 carbon atoms.

References Cited in the file of this patent

UNITED STATES PATENTS

| | | |
|---|---|---|
| 2,068,424 | Mark et al. | Jan. 19, 1937 |
| 2,787,604 | Miller | Apr. 2, 1957 |

FOREIGN PATENTS

| | | |
|---|---|---|
| 604,349 | Canada | Aug. 30, 1960 |

OTHER REFERENCES

Walker et al.: Journal American Chemical Society, vol. 74, pages 2547–2549 (1952).

Moilliet et al.: Surface Activity (pages 268–274 and 280–284) 1st Ed., D. Van Nostrand (N. Y.) 1951.